(12) United States Patent
Jyh

(10) Patent No.: US 7,480,137 B1
(45) Date of Patent: Jan. 20, 2009

(54) LOCKUP STRUCTURE OF MOBILE HARD DRIVE

(75) Inventor: James Chian Huang Jyh, Cerritos, CA (US)

(73) Assignee: Wei Hung Technology Co., Ltd., Taipei Hsien (JP)

( * ) Notice: Subject to any disclaimer, the term of this patent is extended or adjusted under 35 U.S.C. 154(b) by 24 days.

(21) Appl. No.: 11/777,273

(22) Filed: Jul. 12, 2007

(51) Int. Cl.
*G06F 1/16* (2006.01)

(52) U.S. Cl. .................. 361/685; 360/90.7; 165/104.33; 29/737

(58) Field of Classification Search .................. 360/75, 360/122, 245.1, 90.7; 361/679–687, 724–727, 361/760; 165/104.33; 174/355; 29/603.3, 29/737; 439/135, 564
See application file for complete search history.

(56) References Cited

U.S. PATENT DOCUMENTS

| 6,456,491 | B1 * | 9/2002 | Flannery et al. | 361/685 |
| 2004/0036996 | A1 * | 2/2004 | Krause et al. | 360/75 |
| 2007/0253159 | A1 * | 11/2007 | Lin et al. | 361/687 |
| 2008/0212297 | A1 * | 9/2008 | Ni et al. | 361/760 |

\* cited by examiner

*Primary Examiner*—Hung V Duong

(57) ABSTRACT

This invention relates to a lockup structure of mobile hard drive, and comprises a base plate for receiving a hard drive, a lock member having a block sheet, a base frame having a through hole for mounting the lock member, and a spiral arm. At a free end of the spiral arm comprises a protruding block for locating into the base plate and a notch for positioning the block sheet of the lock member, and at a fixing end comprises a position block mounted into a shell. Thus, when in locking position, the spiral arm cannot be pushed outwardly and the position block can prevent the base plate from withdrawing from the shell, therefore, a wrong withdrawal will be avoided.

8 Claims, 9 Drawing Sheets

LOCKUP STRUCTURE OF MOBILE HARD DRIVE

BACKGROUND OF THE INVENTION

1. Field of the Invention

The present invention relates to a lockup structure of mobile hard drive, particularly to the lock member and the spiral arm are assembled at two sides of the base plate, as the spiral arm is in locking position, the notch at the free end of the spiral arm is used for position the block sheet of the lock member, and the position block at fixing end of the spiral arm is located in the fixed slot of the shell to get positioned and prevent a wrong withdrawal.

2. Description of the Related Art

Following to the advancement and popularity of computer technology, computers have entered into our daily life. The great development of computer industry has resulted in types of functions of computer, furthermore, along with broad application of computers, a lot of data such as personnel photo, bank accounts, password or database, R&D data and commercial secrets of company are stored in the hard drive of the computers. In case of the computer is attacked by virus and damaged by people, data stored in the computer would be destroyed, thus, the data saved in the computer have to backup.

However, due to large quantity of data and small capacity of the portable USB disk, so that it is impossible to backup data saved in the hard drive. Although the built-in hard drive has enough capacity to backup the data, however, it is difficult to disassemble quickly and is also inconvenient to carry with after disassembly, thus, some manufacturers developed the mobile hard drive.

Referring to FIG. 9, a chamber A1 is made in an external shell A, and a open A11 is set at one side of the chamber A1. Meanwhile, a mobile device B can be mounted in the chamber A1. The mobile device B comprises a rotating and displacing handle B1 at front side thereof, furthermore, a hard drive B2 is installed in the mobile device B, and a connection port B3 at rear side of the mobile device B for connecting with hard drive B2 to transform different types of connection interfaces for hard drive B2. Therefore, the mobile device B can be used for disengaging the hard drive B2 from the external shell A quickly.

Although the mobile hard drive is characterized by quick installation and easy disengagement, however, as the mobile hard drive is inserted into the computer, if the user bumps or disengages accidentally, or while transporting, the hard drive may be drop off since the mobile hard drive is not fixed in the external shell. Therefore, how to overcome the above disadvantages of the mobile hard drive is the objective of the relevant manufacturers.

SUMMARY OF THE INVENTION

The main objective of the present invention is that a position block is made at the fixing end of the spiral arm, as the spiral arm is in locking position, the position block is located in the fixing slot of the shell, so that hard drive will not drop off when the shell tilts or displace, thus, the hard drive can be fixed properly.

The second objective of the present invention is that as this spiral arm is in locking position and the position block of the spiral arm is located in the fixing slot of the shell, the preset key inserts into the lock head of the lock member to turn with the block sheet at rear of the lock axis to position the block sheet into the notch of the spiral arm. Even if the preset key is withdrawn from the lock member, it is impossible to push the spiral arm outwardly, thus, the hard drive cannot be disengaged from the shell.

The third objective of the present invention is that when the spiral arm is in locking position, the position block at the fixing end and the buckling groove at the free end can be positioned by the limiting spring arm and the buckle of the base frame respectively to prevent the spiral arm from opening due to tilting, vibration or other unexpected incidents, meanwhile, the user doesn't need to confirm whether the block sheet of the lock member is aimed at the notch of the spiral arm.

DETAILED DESCRIPTION OF THE PREFERRED EMBODIMENT

Figure 1:
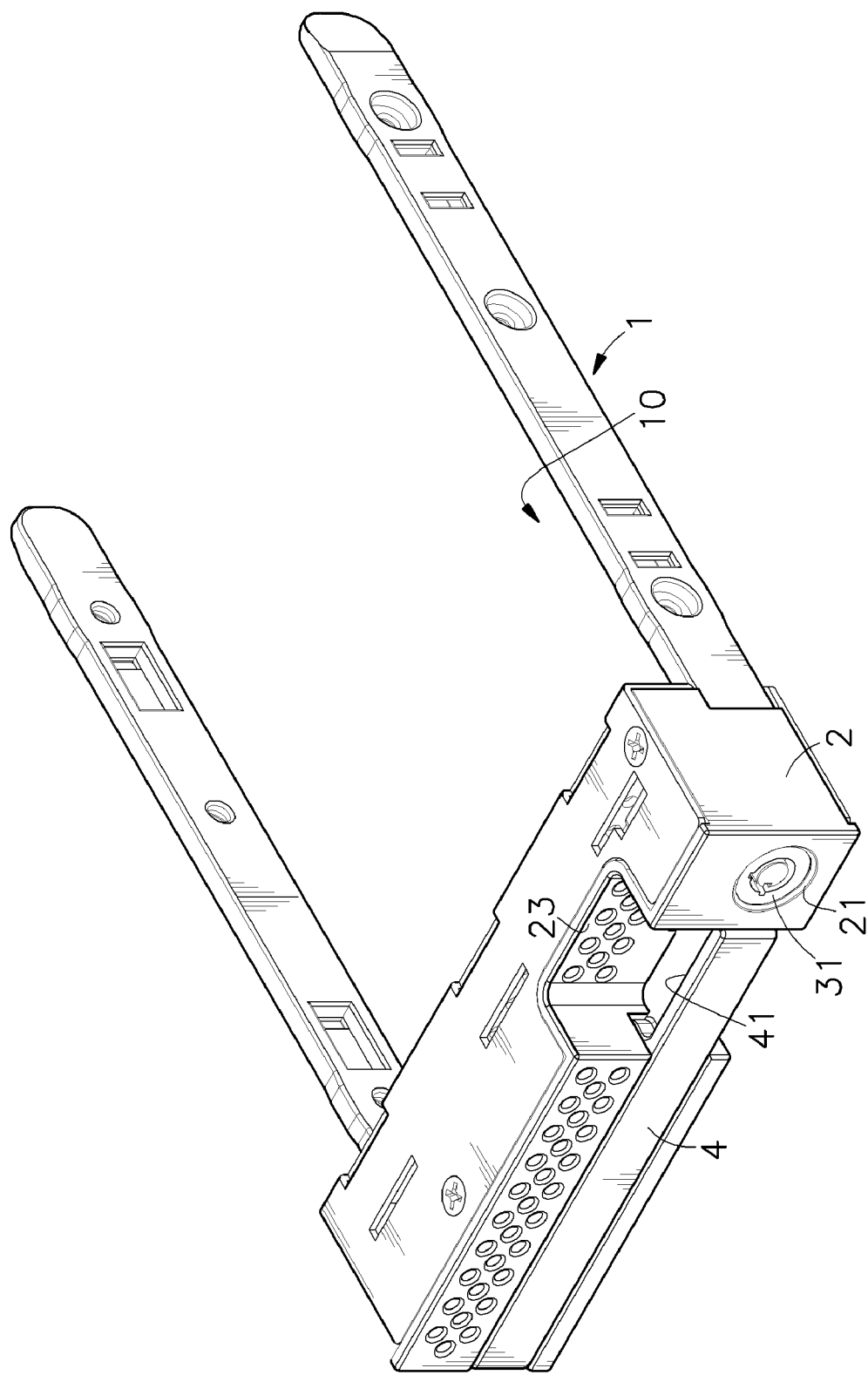
FIG. 1 is the exploded appearance of this invention.

Referring to FIGS. 1, 2, 3, 4 and 7, a lockup structure of mobile hard drive of the present invention is shown comprised of a base plate 1, a base frame 2, a lock member 3, a spiral arm 4 and a hard drive 5.

The base plate 1 has a chamber 10 for receiving the hard drive 5, and a groove 11 is made in front of the base plate 1.

The base frame 2 comprises a through hole 21 at one side for mounting the lock member 3, a sectional slot 22 at another side, and a concave portion 23 between the through hole 21 and the sectional slot 22. The through hole 21 has a position slot 211 at the back side thereof. The sectional slot 22 inside has an axial portion 221 which is used for pivoting the spiral arm 4, and a limiting spring arm 222 at the rear side of the axial portion 221. The concave portion 23 has a through slot 231 at one lateral side, and a buckle 232 is suspended in the through slot 231 at one side.

The lock member 3 has a lock head 31 for inserting a preset key, a block sheet 33 fixed at rear side of the lock head 31, and two position elements 32 between the lock head 31 and the block sheet 33. The lock head 31 comprises a lock axis 311 that can rotate with the preset key inserted into the lock head 31.

The spiral arm 4 has a handle 41 at the free end for grasping by a user, which comprises a protruding block 42, a notch 421 and a buckling groove 422 at one side, and a position block 43 at the fixed end. The position block 43 comprises a limiting block 431 extended from one side.

The hard drive 5 is one set of hard driver with different types, sizes or specifications.

During installation, the base frame 2 is fixed in the groove 11 of the base plate 1, and the lock member 3 is mounted in the through hole 21 of the base plate 2 enable the lock head 31 of the lock member 3 protruded out of the through hole 21. Then, the position element 32 of the lock member 3 is inserted into the position slot 211 of the through hole 21 for positioning.

Meanwhile, the spiral arm 4 is pivoted with the axial portion 221 inside the sectional slot 22 of the base frame 2, so that the spiral arm 4 can turn between the locking position that the protruding block 42 is received into the concave portion 23, and the unlocking position. Finally, the hard drive 5 is mounted in the chamber 10 of the base plate 1.

Referring to FIGS. 2, 4, 5, 6, 7 and 8, after insertion of the hard drive 5 into the chamber 10 of the base plate 1, turn the handle 41 of the spiral arm 4 to force the protruding block 42 into engagement with the through slot 231 of the concave portion 23 (i.e., turn the spiral arm 4 from the unlocking position to the locking position). At this time, the present key is inserted into the lock head 31 of the lock member 3 within the through hole 21 to turn the block sheet 33 at rear side of the lock axis 311 counter-clockwise so that the block sheet 33 is buckled into the notch 421 of the protruding block 42, thereby securing the spiral arm 4 positively in the sectional slot 22 of the base frame 2.

When turning the lock head 3 with the lock axis 311 of the lock member 3 in the reversed direction from the locking position to the unlocking position, the block sheet 33 is turned clockwise to disengage from the notch 421 of the spiral arm 4. Thus, the user can directly open the spiral arm 4 by a hand.

In addition, the spiral arm 4 will not disengage from the base frame 2 by an external force as the block sheet 33 of the lock member 3 is buckled into the notch 421 of the spiral arm 4. Meanwhile, the position block 43 of the spiral arm 4 is also fixed in a fixing slot 61 of a shell 6. Thus, the base plate 1, the base frame 2 and the hard drive 5 can be positioned in the shell 6, and any wrong withdrawal will also be avoided accordingly.

Figure 2:
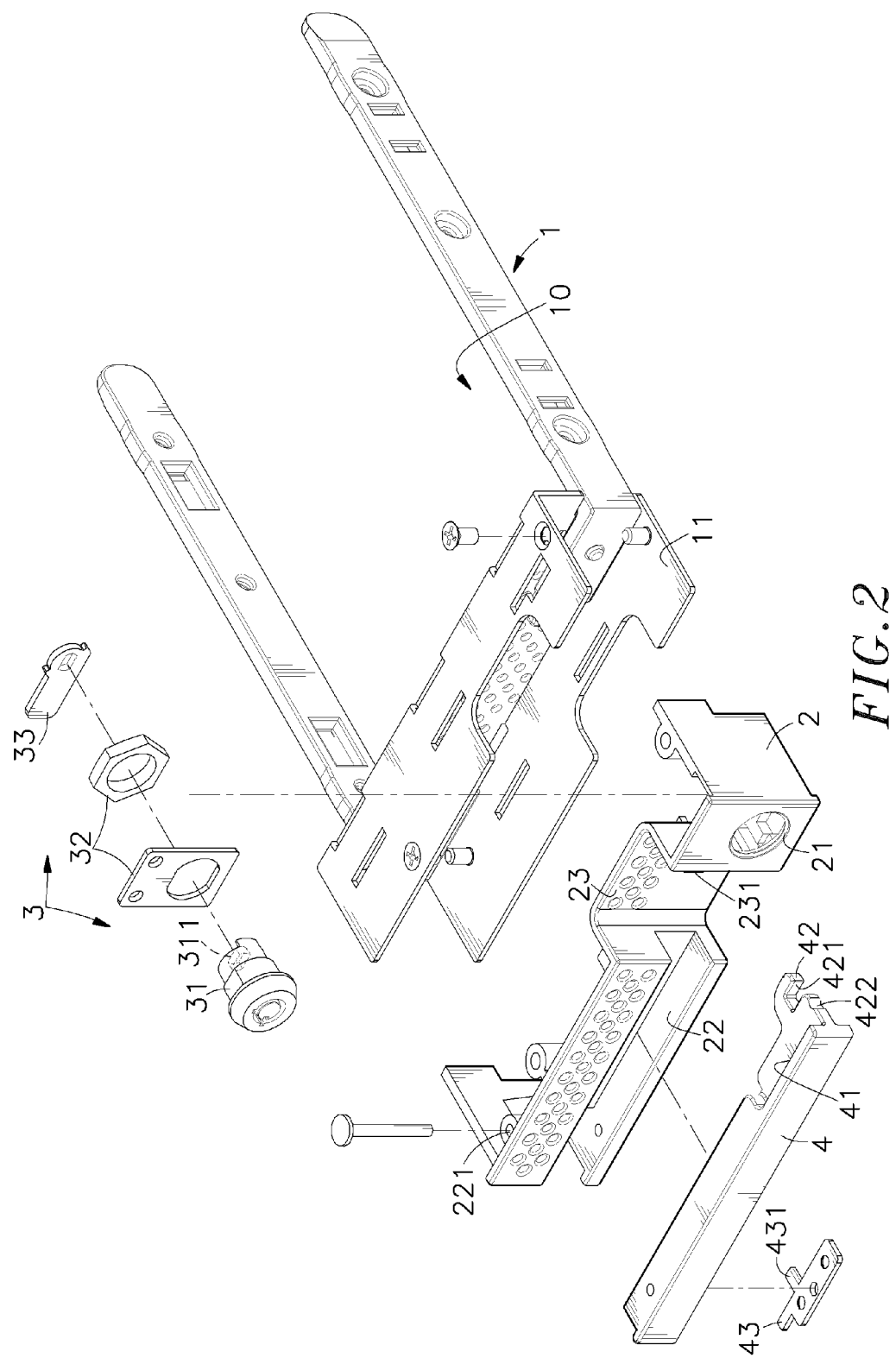
FIG. 2 is the exploded view of this invention.
Figure 3:
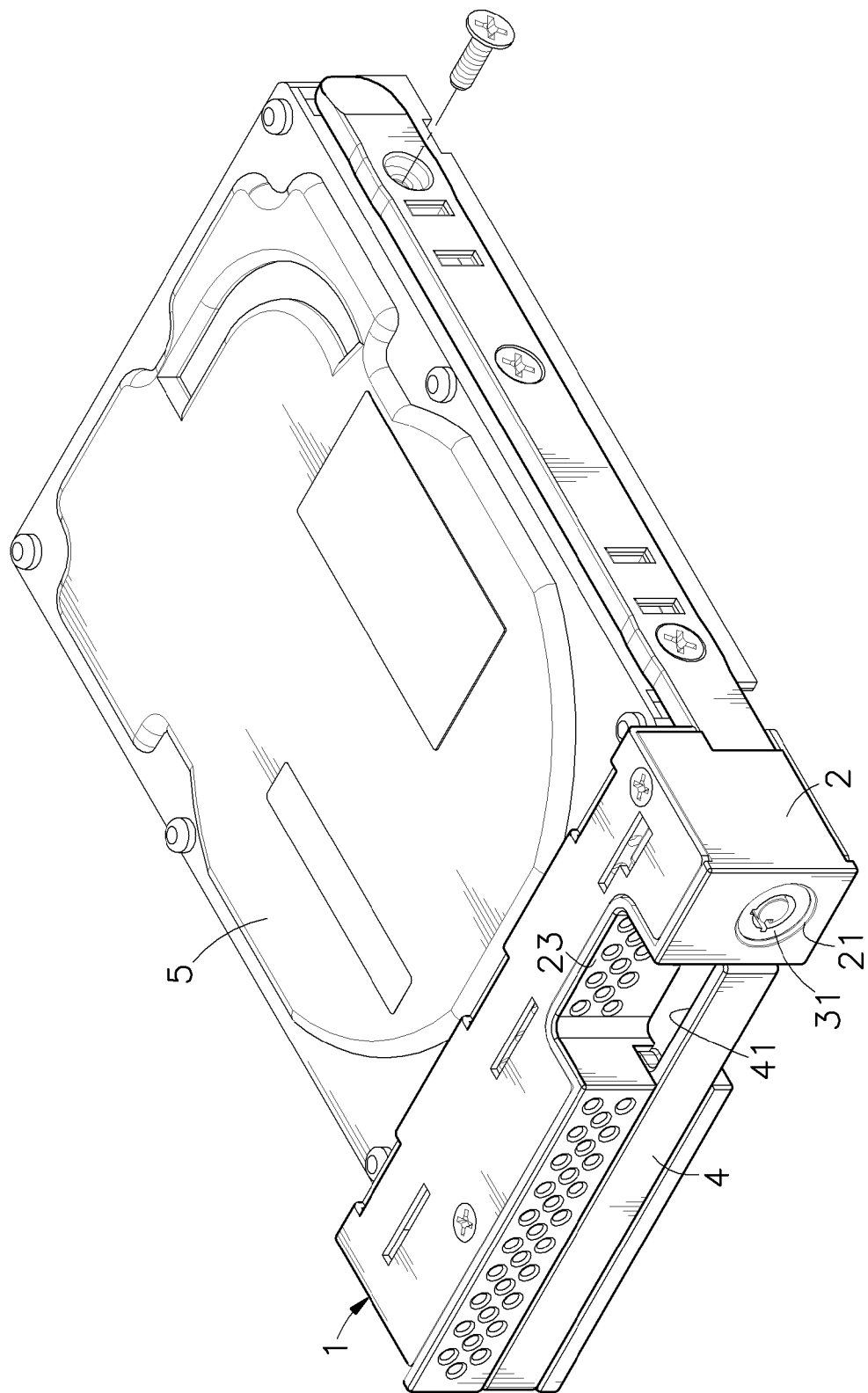
FIG. 3 is the exploded appearance of the preferred embodiments of this invention.
Figure 4:
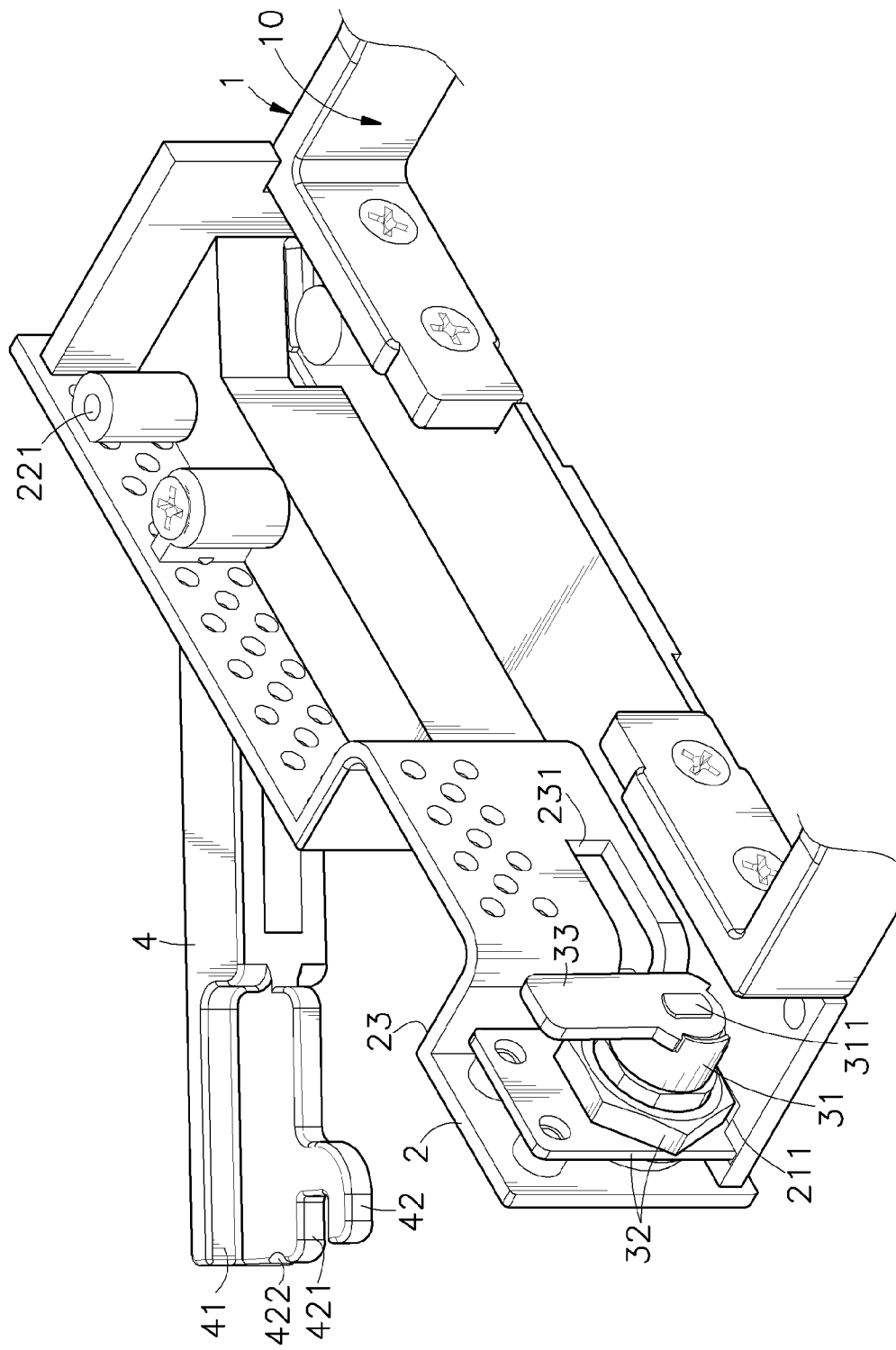
FIG. 4 is the exploded sketch map of this invention before lockup.
Figure 5:
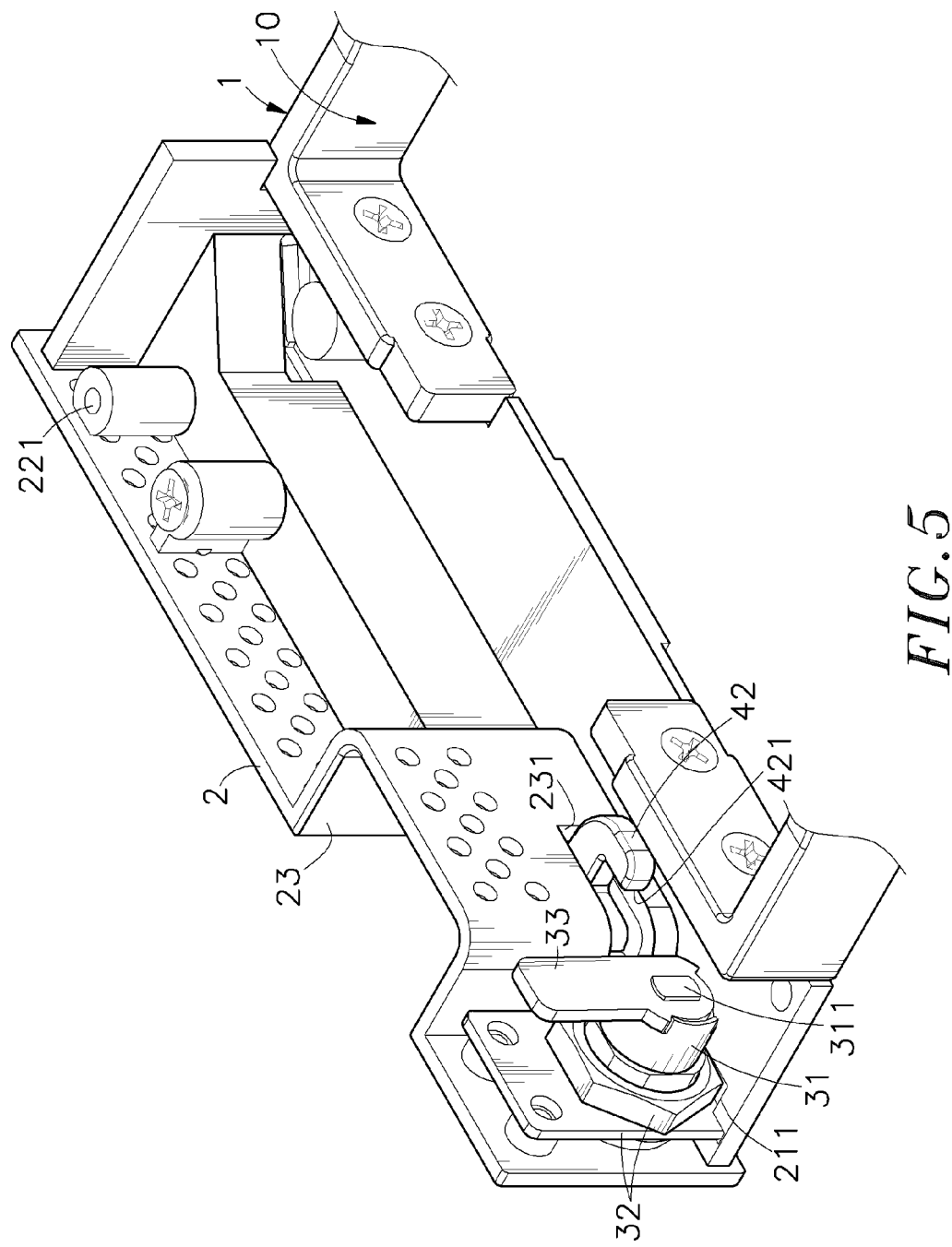
FIG. 5 is the exploded sketch map of this invention under lockup.
Figure 6:
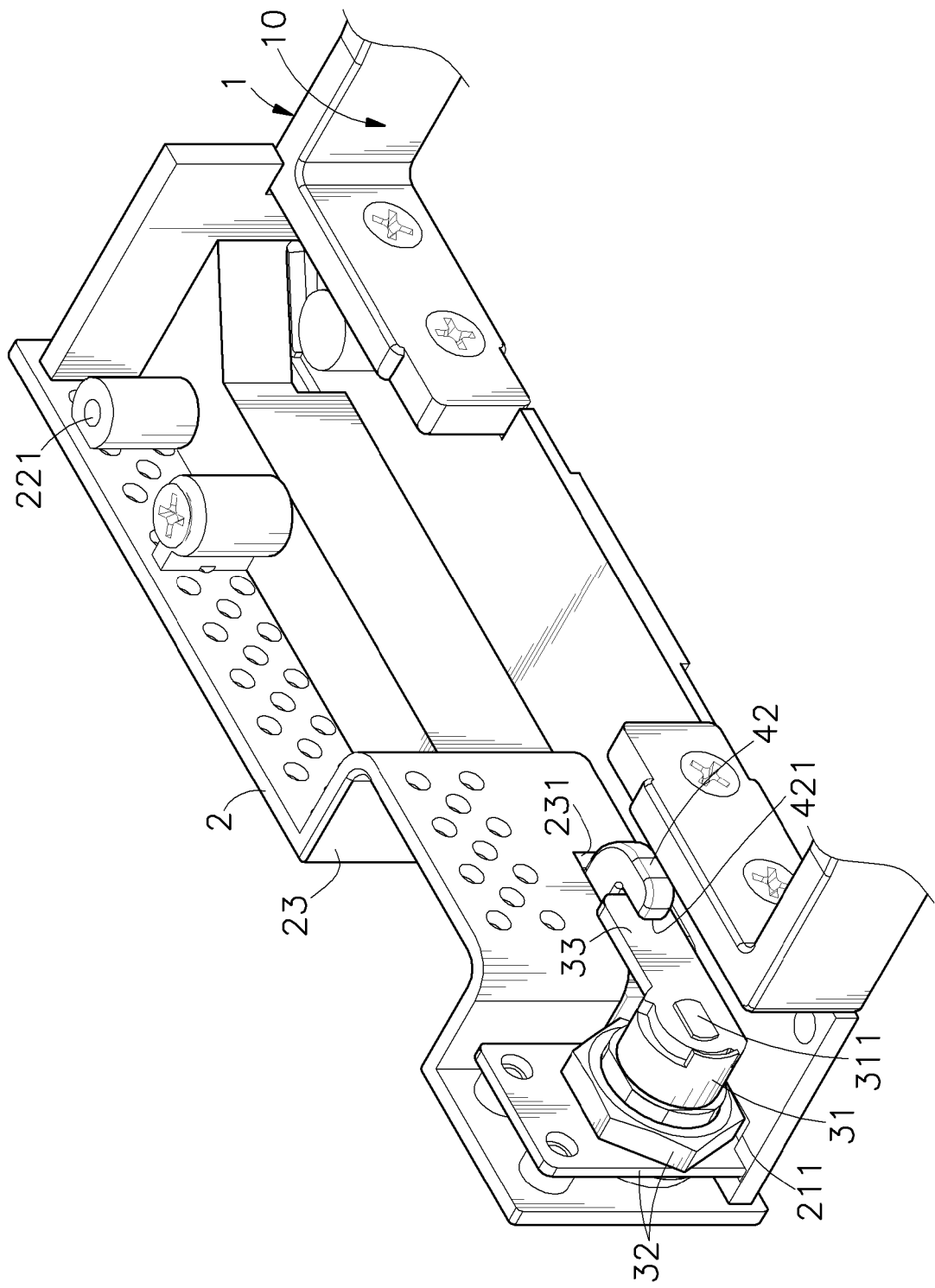
FIG. 6 is the exploded sketch map of this invention after lockup.
Figure 7:
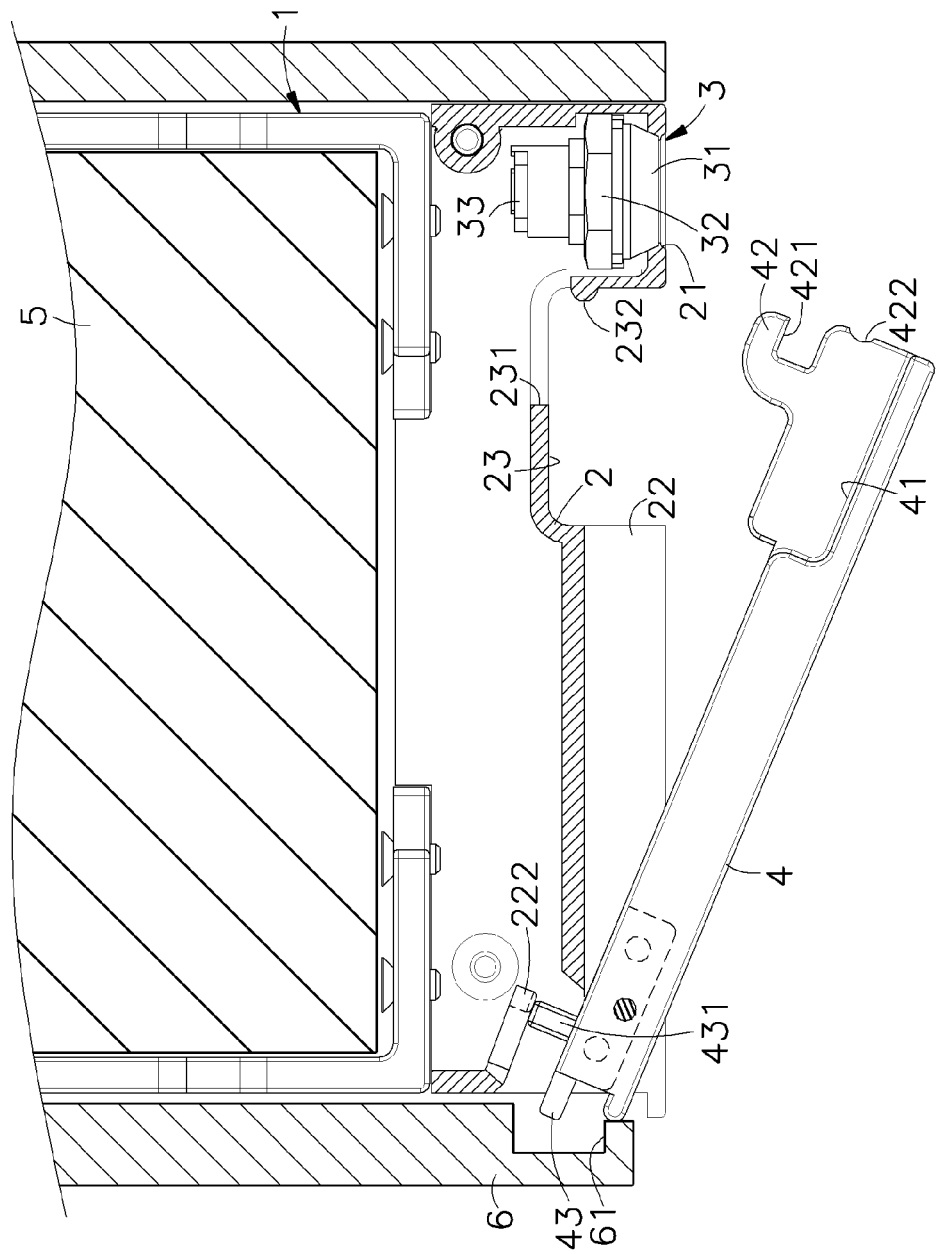
FIG. 7 is the plan-form of this invention before lockup.
Figure 8:
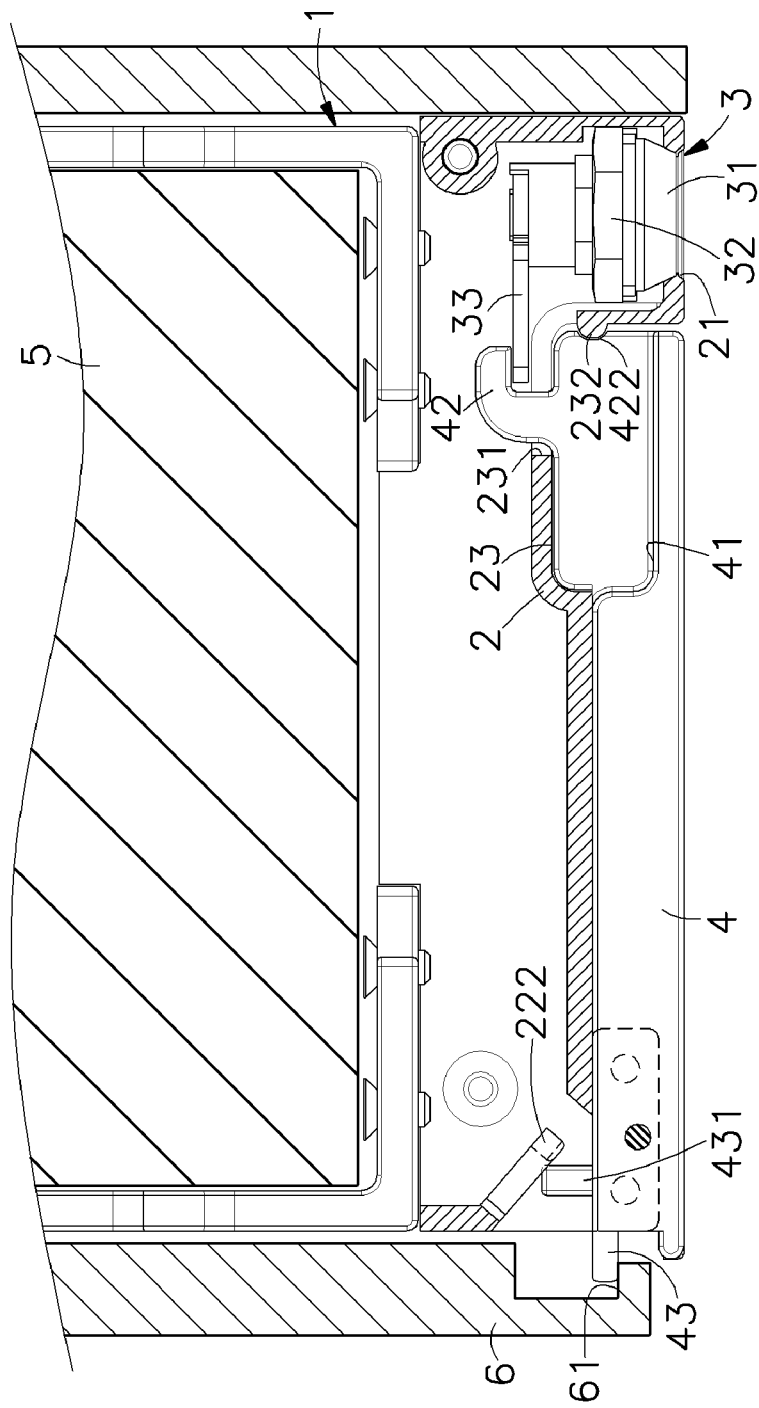
FIG. 8 is the plan-form of this invention after lockup.
Figure 9:
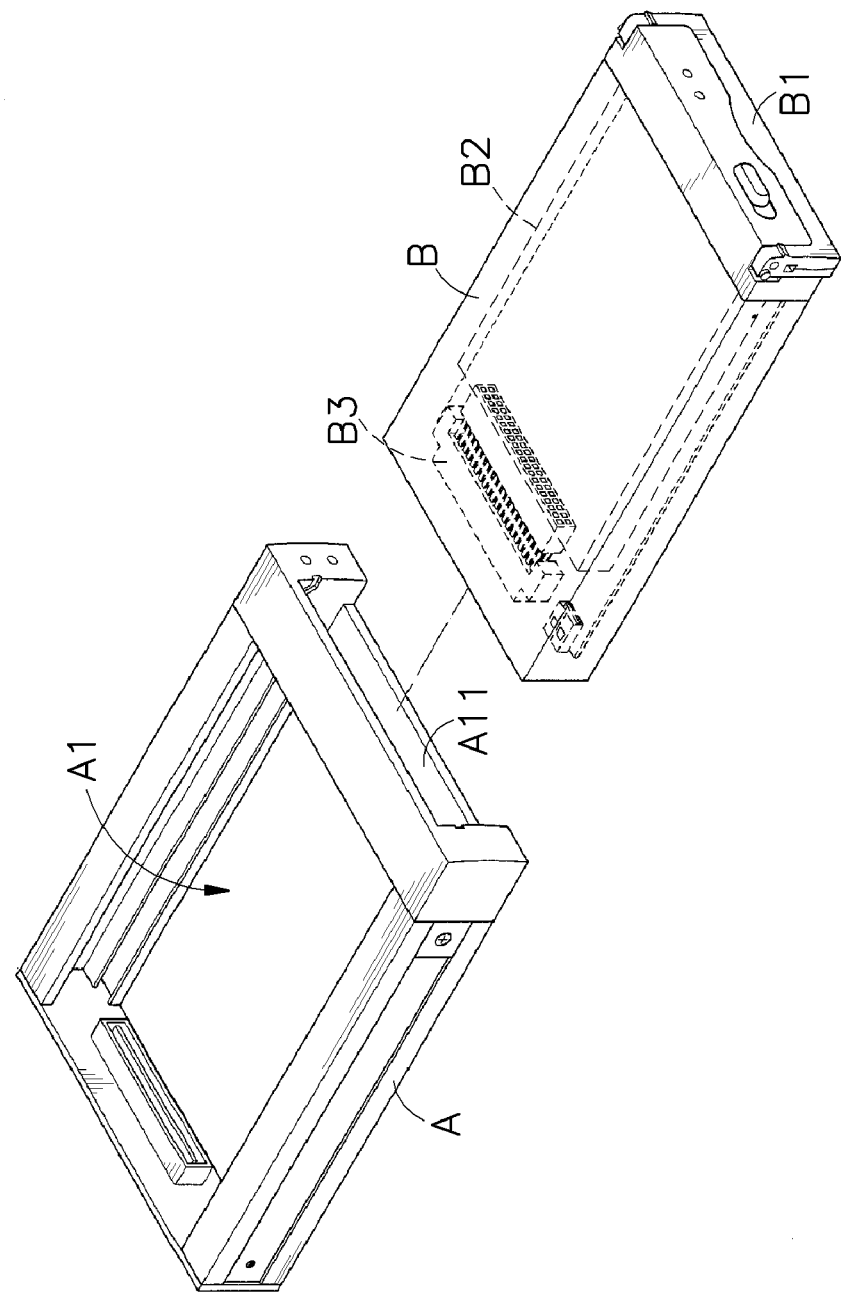
FIG. 9 is the usual exploded appearance of this invention.

Referring to FIGS. 2, 7 and 8, when mounting in the shell 6, the position block 43 and the limiting block 431 are positioned at the fixing end of the spiral arm 4, and if the user pushes the free end of the spiral arm 4 outwardly, the limiting block 431 will be pushed against the limiting spring arm 222 to force the limiting spring arm 222 to produce elastic distortion. Furthermore, such elastic distortion of the limiting spring arm 222 will be limited as reaches a preset distance, so that the spiral arm 4 will not rotate continuously, thus, the spiral arm 4 can be limited. At this moment, the base plate 1 can be disengaged from the shell 6. On the contrary, if the user stops pushing the free end of the spiral arm 4 outwardly, the elasticity of the limiting spring arm 222 can push the limiting block 431 of the spiral arm 4 so as to let the spiral arm 4 move toward the sectional slot 22 of the base frame 2.

The shell 6 can be a socket in the computer for receiving a mobile hard drive or CD driver, and it is used to insert the hard drive 5 to connect the computer for data transmission. Besides, the fixing slot 61 of the shell 6 is used to position the position block 43 of the spiral arm 4.

Furthermore, when the user pushes the spiral arm 4 to the locking position, the protruding block 42 of the spiral arm 4 will be moved into the concave portion 23 of the base frame 2 against the buckle 232 in the concave portion 23 to produce elastic displacement. As the spiral arm 4 continues to move against the base frame 2 for positioning, the buckling groove 422 at one side of the protruding block 42 is used to reset the buckle 232. Because the buckle 232 of the base frame 2 is rest in the buckling groove 422 of the spiral arm 4, the free end of the spiral arm 4 can be positioned in the concave portion 23 of the base frame 2 positively. Meanwhile, when the user inserts the preset key into the lock member 3 to turn the lock head 31 with the block sheet 33 counter-clockwise, the block sheet 33 can be positioned in the notch 421 of the spiral arm 4, and the user doesn't align it first before operation.

The position block 43 and the limiting block 431 at the fixing end of the spiral arm 4 can be fixed at the spiral arm 4 separately, or one-body molded with the spiral arm 4.

The lockup structure of mobile hard drive of the present invention is practical, and its advantages are as follows.

1. As the spiral arm 4 is in locking position, the position block 43 can be positioned in the fixing slot 61 of the shell 6 that can prevent the hard drive 5 out off the shell 6, therefore, the hard drive 5 can be positioned in the shell 6 properly.

2. As the spiral arm 4 is in locking position and the position block 43 is positioned in the fixing slot 61 of the shell 6, the user can insert the preset key into the lock head 31 of the lock member 3 to turn the lock head 31 with the block sheet 33 counter-clockwise enable the block sheet 33 located into the notch 421 of the spiral arm 4. Even if the user withdraws the preset key from the lock member 3, since the spiral arm 4 can not be pushed outwardly, it is also impossible to disengage the hard drive 5 from the shell 6, therefore, the hard drive 5 can be locked up and avoid wrong withdrawal accordingly.

3. As the spiral arm 4 is in locking position, the position block 43 at the fixing end and the buckling groove 422 at free end of the spiral arm 4 are against the limiting spring are 222 and the buckle 232 respectively to prevent the spiral arm 4 from opening due to slant, vibration or other unexpected situations. Besides, the user doesn't need to confirm whether the block sheet 33 of the lock member 3 is aimed at the notch 421 of the spiral arm 4, so, operation of the present invention is very easy.

Therefore, the lockup structure of mobile hard drive of the present invention comprises the base plate 1, the lock member 3 and the spiral arm 4. The block sheet 33 of the lock member 3 can be located in the notch 421 at the free end of the spiral arm 4, and the position block 43 at the fixing end of the spiral arm 4 is positioned in the fixing slot 61 of the shell 6, so that the hard drive 5 installed in the base plate 1 will not be withdrawn or stolen. However, above descriptions are only the preferred embodiments of this invention, but not limited to the patent claims of this invention, therefore, all simple decorations and structural changes basing on instructions and drawings of this invention will be included into the patent claims of this invention.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A lockup structure of the mobile hard drive, particularly relates to the mobile hard drive free of wrong withdrawal after lockup, comprising:

a base plate, said base plate having a chamber for receiving a hard drive, and a groove at front side thereof;

a lock member, said lock member having a lock head and a block sheet at rear side of said lock head;

a base frame, said base frame mounted in said groove of said base plate, having a through hole at one side for mounting said lock member, a sectional slot at another side, and an axial portion at a rear side of said sectional slot; and a spiral arm, said spiral arm mounted in said sectional slot of said base frame, having a free end and a fixing end, and at said free end comprising a protruding block moved into said groove of said base plate, and a notch for locating said block sheet of said lock member, and at said fixing end comprising a position block.

2. The lockup structure of mobile hard drive of claim 1, wherein said base plate and said base frame can be one-body molded.

3. The lockup structure of mobile hard drive of claim 1, wherein said sectional slot comprises an elastic limiting spring arm at rear of said axial portion; said spiral arm comprises a limiting block at said fixing end that is perpendicular to said position block and against said limiting spring arm.

4. The lockup structure of mobile hard drive of claim 3, wherein said position block and said limiting block can be separated sheet which are connected to said fixing end of said spiral arm, and said spiral arm, said position block and said limiting block can be one-body molded.

5. The lockup structure of mobile hard drive of claim 1, wherein said base frame further comprises a concave portion between said through hole and said sectional slot, and said concave portion has a through slot for positioning said protruding block of said spiral arm.

6. The lockup structure of mobile hard drive of claim 5, wherein said through slot of said concave portion further comprises an elastic buckle; said protruding block of said spiral arm comprises a buckling groove for buckling with said buckle.

7. The lockup structure of mobile hard drive of claim 1, wherein said base frame comprises a position slot at rear of said through hole; said lock member comprises a position element between said lock head and said block sheet for positioning into said position slot.

8. The lockup structure of mobile hard drive of claim 1, wherein said spiral arm further comprises a handle at free end for grasping by a user.

* * * * *